3,050,766
SANITIZING DEVICE FOR DAIRY COWS
Max E. Millikin, 6972 John St., Brown City, Mich.
Filed June 28, 1961, Ser. No. 120,417
1 Claim. (Cl. 15—264)

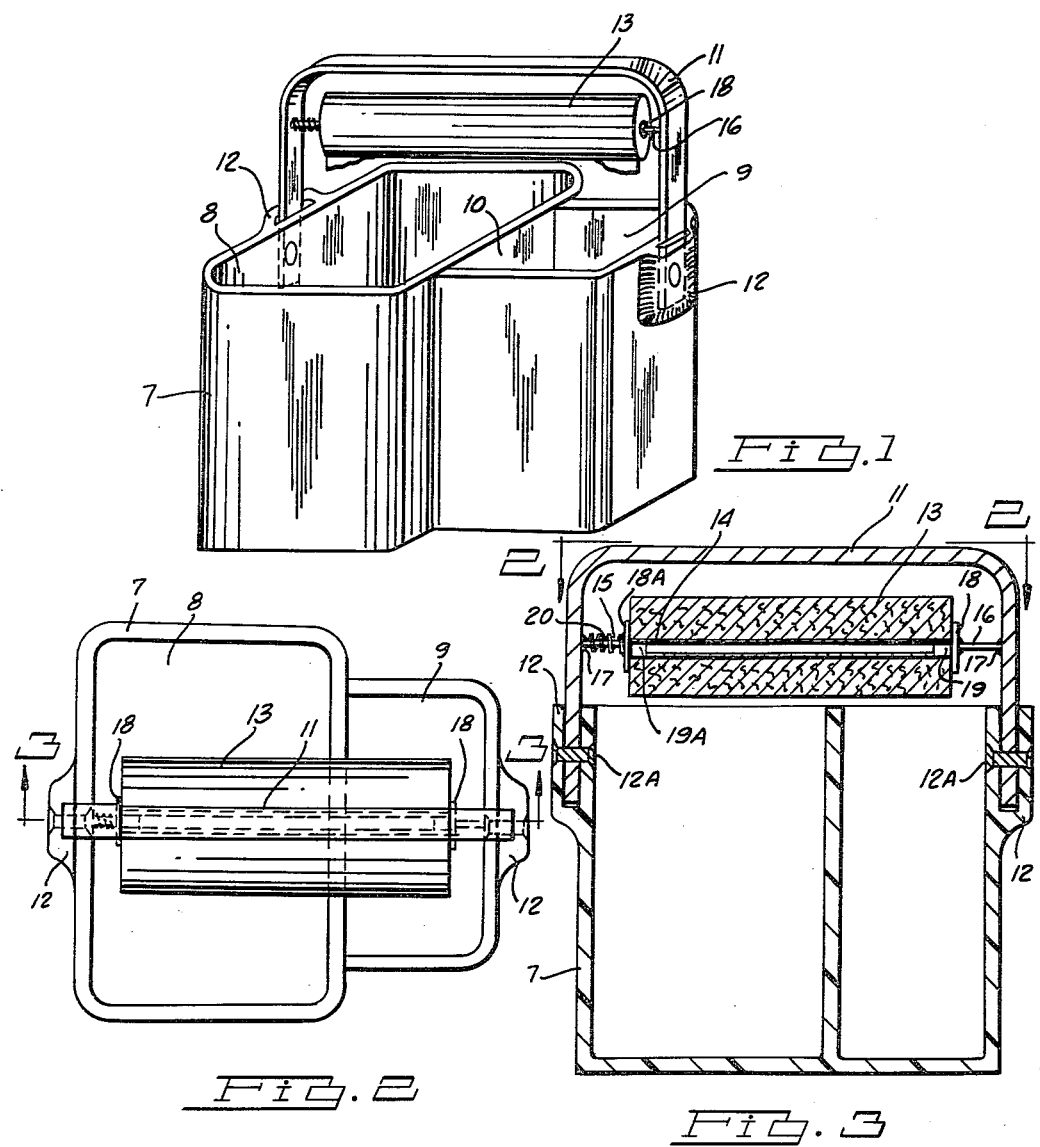

This invention relates to the dairy industry and has particular reference to a device for use in washing and disinfecting the udder of a dairy cow, prior to milking.

It is the law in many jurisdictions that the udder of a dairy cow must be washed and disinfected before the cow may be milked. This applies whether the milking is done by a milking machine, or manually. Heretofore, it has been the practice for the milkers to wash the udders of the several cows with a common towel or cloth, which practice defeats the purpose of the law, and if any one cow is contaminated, such contamination may be spread throughout the herd. Therefore, it is an object of this invention to obviate the foregoing difficulties, and to provide a device which will enable the milker to wash and disinfect each cow individually, thereby obviating the possibility of spreading disease and contamination from one animal to another.

A further object of the invention is to provide a device which is simple in construction, economical to manufacture, and one which may be transported from animal to animal with a minimum of effort.

A further object of the invention is to provide a device of the character indicated, which has a compartment for the disinfecting solution and a compartment for receiving and disposing of the towels after the individual towels have been used to disinfect one animal.

A further object of the invention is to provide a device of the character indicated, which is integrated to provide for carrying the disinfectant to the animal, together with a fresh supply of towels, or the like, and means for disposing of the used towels.

The foregoing and other objects and advantages of the invention will become more apparent as the description proceeds, reference being made from time to time to the accompanying drawing, forming part of the within disclosure, in which drawing:

FIG. 1 is a perspective view of a device embodying the invention.

FIG. 2 is a top plan view thereof.

FIG. 3 is a section taken substantially on the line 3—3 of FIG. 2.

Referring now more particularly to the drawing, it will be understood that in the embodiment herein disclosed, the reference character 7 indicates, in general, the device embodying the invention. The member 7 is preferably fabricated of fiberglass or some plastic material, such as polyethylene, or other material, having inert characteristics. The member 7 may be formed by moulding, or by other suitable process, and is provided with a comparatively large compartment 8 and a relatively small compartment 9, said compartments having a common wall 10. The compartment 8 is intended for the storage and carrying of a suitable disinfecting liquid, which will meet the requirements of the law for the washing and disinfecting of the dairy animal, and the compartment 9 is intended for the use in receiving, collecting and disposal of used towels after the washing and disinfecting operations have been completed. Secured to the opposite walls of the member 7 is a handle, or bail 11, the ends of which are received in pockets 12, formed in the walls of the device. The ends of the bail 11 are secured in the pockets 12 by riveting, cementing, as at 12A, or other suitable means. A towel supply 13 is carried by the bail 11. The towel supply 13 is preferably in the form of a roll of paper towels, or the like, which may be purchased in the open market. A conventional roll of paper towels is carried on a tubular member 14 (FIG. 3), the ends of the tube 14 being supported in brackets 15 and 16 which are welded, as at 17, or otherwise secured to the bail 11. The brackets 16 has a disc-like member 18, welded or otherwise secured thereto, which disc 18 has a hub 19 formed on its inside face, which hub extends into the end of the tubular member 14. The disc 18A and the hub 19A are slidably mounted on the bracket 15 and are spring-backed, as at 20, so that the tubular members 14 and the towel supply 13 may readily be mounted on the brackets, and the tubular member 14, may easily be removed therefrom when the supply of toweling material 13 has been exhausted.

In using the device, a fresh supply of toweling material 13 is first installed on the bail 11 and a supply of suitable disinfecting material is placed in the compartment 8, and the device is carried by the bail 11 to a position near the udder of the dairy cow to be disinfected. A clean section of the toweling 13 is then withdrawn from the supply 13 and dipped into the disinfectant and used to clean the udder and teats of the cow, before the milking operation has begun. The section of toweling 13, so used, is then deposited in the receptacle 9 and the device is transported to the next dairy cow where the operation is then repeated. In this manner, a clean towel and uncontaminated disinfectant is used for each animal.

It is believed that the operation of the device is obvious from the foregoing description.

Having described my invention, what I claim and desire to secure by Letters Patent is:

A device of the character described, comprising a receptacle of non-corrosive inert material, having a comparatively large compartment and a comparatively small compartment, there being a short carrying bail for commonly supporting said compartments, and means on said bail for supporting a roll of toweling material, said towel supporting means consisting of a pair of inwardly directed horizontal brackets supported in spaced relation on said bail, said brackets having disc-shaped elements thereon, said disc-shaped elements having hubs for supporting a roll of material, one of said discs and hubs being spring-backed to permit slidable action on its supporting bracket.

References Cited in the file of this patent
UNITED STATES PATENTS
1,860,655    Chismadia _____ May 31, 1932
2,832,984    Peters _____ May 6, 1958